(12) United States Patent
Roussel et al.

(10) Patent No.: US 9,641,955 B2
(45) Date of Patent: May 2, 2017

(54) TRANSMITTING INFORMATION

(75) Inventors: Joris Roussel, Paris (FR); Guillaume Baron, Saint Cyr (FR); Bruce Forgues, Paris (FR)

(73) Assignee: Thomson Licensing, Issy-les-Moulineaux (FR)

( * ) Notice: Subject to any disclaimer, the term of this patent is extended or adjusted under 35 U.S.C. 154(b) by 187 days.

(21) Appl. No.: 13/878,215

(22) PCT Filed: Oct. 6, 2011

(86) PCT No.: PCT/EP2011/067448
§ 371 (c)(1),
(2), (4) Date: Apr. 6, 2013

(87) PCT Pub. No.: WO2012/049063
PCT Pub. Date: Apr. 19, 2012

(65) Prior Publication Data
US 2013/0210398 A1 Aug. 15, 2013

(30) Foreign Application Priority Data

Oct. 12, 2010 (EP) .................................... 10306108

(51) Int. Cl.
*H04W 4/00* (2009.01)
*H04L 12/18* (2006.01)
*H04L 29/08* (2006.01)

(52) U.S. Cl.
CPC .......... *H04W 4/00* (2013.01); *H04L 12/1859* (2013.01); *H04L 67/26* (2013.01); *H04L 67/32* (2013.01); *H04L 12/189* (2013.01)

(58) Field of Classification Search
CPC .......... H04N 21/2387; H04N 21/6587; H04N 21/2747; H04N 7/17336; H04N 21/4333; H04N 21/43615; H04N 21/47202; G06F 17/30902
USPC .................... 455/414.1, 414.2; 709/226, 231
See application file for complete search history.

(56) References Cited

U.S. PATENT DOCUMENTS

| 7,058,691 | B1 | 6/2006 | Yu et al. |
| 7,327,724 | B2 | 2/2008 | Muhonen et al. |
| 2007/0073835 | A1 | 3/2007 | Husa et al. |
| 2007/0239874 | A1 | 10/2007 | Lazaridis |
| 2008/0065688 | A1 | 3/2008 | Shenfield |
| 2008/0140789 | A1 | 6/2008 | Mulligan et al. |
| 2008/0162711 | A1 | 7/2008 | Luu |
| 2009/0240807 | A1 | 9/2009 | Munson |

(Continued)

FOREIGN PATENT DOCUMENTS

| FR | 2 842 681 A1 | 1/2004 |
| JP | 2002334033 | 11/2002 |

(Continued)

*Primary Examiner* — Chuong A Ngo
(74) *Attorney, Agent, or Firm* — Myers Wolin, LLC

(57) ABSTRACT

The present invention relates to the transmission of push information to a handset. Before pushing a page to the handset, it is checked that the page belongs to the same service as the page currently display. If the page to be pushed belongs to a different service, it is not pushed. The risk of disruption to the original service is thereby reduced. Checking is preferably done by a gateway to which the handset is connected. The gateway can store details of the page last transmitted to the handset in order to facilitate the check.

22 Claims, 20 Drawing Sheets

(56) References Cited

U.S. PATENT DOCUMENTS

| | | | |
|---|---|---|---|
| 2009/0318192 A1* | 12/2009 | Leblanc | G11B 27/10 |
| | | | 455/558 |
| 2010/0087179 A1* | 4/2010 | Makavy | H04L 67/36 |
| | | | 455/418 |
| 2010/0169778 A1* | 7/2010 | Mundy | G06F 17/30905 |
| | | | 715/716 |
| 2010/0235329 A1* | 9/2010 | Koren | G06F 17/30902 |
| | | | 707/687 |
| 2011/0004892 A1* | 1/2011 | Dharmaji | G06F 15/02 |
| | | | 725/9 |

FOREIGN PATENT DOCUMENTS

| | | |
|---|---|---|
| JP | 2005165697 | 6/2005 |
| WO | 2006/109202 A1 | 10/2006 |
| WO | 2009/056026 A1 | 5/2009 |

* cited by examiner

TRANSMITTING INFORMATION

This application claims the benefit, under 35 U.S.C. §365 of International Application PCT/EP2011/067448, filed Oct. 6, 2011, which was published in accordance with PCI Article 21(2) on Apr. 19, 2012 in English and which claims the benefit of European patent applications No. 10306108.1, filed Oct. 12, 2010.

The present invention relates to the transmission of information, in particular to the transmission of information in a push manner.

It is known to transmit information to a node, in particular a mobile node such as user handset in different ways. In one manner, known as the pull manner, the information is transmitted in response to a request originating from the node. Once the information requested has been transmitted, a further request is normally needed in order for further information to be transmitted. One benefit of pulling information in this way is that it is transmitted in direct response to the request from the user, giving the user control over when the information is received. One example of pulling information is a user entering a search string on the browser of a personal computer, and a remote server returning a page containing a list of matching links. The user can then perform a further pull action by clicking on a link to retrieve the desired page.

In another method of communicating information, known as the push manner, the decision to transmit information is instigated remotely from the receiving node. For example, a user may have subscribed to a stock-price service. A stock-price server will then transmit a stock-price document to the user node informing the user of a particular stock price. The decision to transmit the document may be made in response to a particular stock price reaching a threshold level. Alternatively, the decision may be made on the basis of a timer, so that a stock price news document is transmitted to the user handset each day for example. In each case, the information is effectively pushed to the user.

Pushing information has the advantage of reducing the bandwidth needed for communication, since the user does not have to transmit a request each time the information is desired. However, there can be situations in which the pushing of information is problematic.

According to one aspect of the present invention, there is provided apparatus for transmitting first content to a node in response to instructions originating externally to the node, which first content, when received, is arranged to cause the node to render the first content instead of second content, if any, rendered at the node, the first and second contents each being associated with a respective service, the apparatus including a processing stage arranged to (i) determine whether the first and second content are associated with a common service, and, (ii) in dependence on whether the first and second content are associated with a common service, cause the first content to be transmitted.

Because the apparatus is arranged to cause the first content to be transmitted to the node in dependence on whether the first and second content are associated with a common service, the apparatus can refrain from causing the first content to be transmitted to the node if it is determined that the first and second content are associated with a different services. As a result, the likelihood will be reduced that a node running one service will receive new content unexpectedly from another service, which new content could disrupt the original service. This is particularly important in the case of content transmitted in response to instructions originating externally to the node, since a user of the node will not normally be able to predict the arrival of the new content.

The content may originate from a service module, and the processing stage may cause the content to be transmitted by transmitting a control instruction to the service module. The service module may be part of the apparatus, in which case the control instruction will preferably be an internal instruction. That is, the processing stage will, preferably, effectively cause the communication stage to transmit the content. Alternatively, the service module may be located remotely from the apparatus, and may be arranged to communicate with the apparatus over a communications network. In this case, the control instruction will preferably be transmitted over the communication network and the content for forwarding to the node will be received over the communication network. The service module may be localised, in which case the content will preferably be received from same location as the destination of the control instructions. However, the service module may be distributed, in which case the origin of the content and the destination of the control instructions may be at different locations.

In the event that the service module is remotely located, the apparatus will preferably have an interface stage for receiving, over the communication network, content from a service module for onward transmission to the node.

In a preferred embodiment, before transmitting content towards the node, the service module is arranged to transmit a request to the apparatus in order to obtain an indication of whether the node is running the same service as the service associated with the first content, that is, the content the service module intends to transmit. The request will preferably contain an indication of the service associated with the first content.

In response to this request, the apparatus is preferably arranged to determine whether the first and second content are associated with a common service. The processing stage is arranged to respond to the request from the service module with a control instruction. In a preferred embodiment, the control instruction is either one of a positive and a negative indication that the first and second content are associated with a common service. If a positive indication is received, the service module is enabled to transmit the content to the apparatus for forwarding to the node. Otherwise, the service module refrains from transmitting the content to the apparatus for onward transmission to the node.

By transmitting either one of a positive and a negative indication, the need is reduced for the apparatus to reveal the identity of the service currently being run or having last run at the node. The privacy of a user of the node is thereby increased. However, the apparatus may transmit the identity of the service being run at the node to the service module, and the service module may in turn determine whether the first and second content are associated with the same service.

The node is preferably arranged to transmit service requests to the apparatus in order to obtain content associated with a service, which service requests contain an indication of the service requested. The communication stage is preferably arranged to receive the service requests. The processing stage is preferably arranged to store an indication of the service associated with at least the last received service request from the node.

Preferably, service requests or a certain class of service requests transmitted from the node must pass through the apparatus. Yet more preferably, if a service from a service module is accessible through the apparatus, the node will be arranged such that service requests for that service must pass through the apparatus. The processing stage can then infer that current content at node cannot be part of the same service as a given content if the stored indication the last service does not match the service of the given content.

However, the apparatus may alternatively or in addition obtain an indication of the service being run at the node by transmitting a request to the node inviting the node to respond with an indication of the service last run or being run, that is, an indication of the service associated with the second content. The processing stage can then use the response from the node to determine whether the first and second content are associated with a common service. Such an approach will be particularly useful in the event that the node is able to access one or more local services originating in the node, or services that can be accessed without a request to the apparatus.

In a preferred embodiment, a plurality of service modules will be provides, each for a different service accessible to the node. One or more service modules may be part of the apparatus, and one or more service modules may be remote from the apparatus, either located at the node, or at a different point in the communication network.

Preferably, the node will be a mobile node, such as one arranged to communicate with the apparatus over a wireless link, either directly or over one or more routers and links which may be arranged as a network. The content can then at least in part be conveniently transmitted to the node over the wireless link. Yet more preferably, node will be a handset such as a telephony handset. Such devices frequently have limited memory, making it more likely that the receipt of content not associated with the service currently running will disrupt that service.

Preferably, the handset will have a display and the content will be image data which can be rendered on the display. In a preferred embodiment, the content will relate to a page for display on a display, and will yet more preferably be arranged such that it can be rendered within or as a single page of the display.

The apparatus may be a home gateway having router functionality to one or more domestic devices on the one hand, and connectivity to a telecommunications network on the other hand. However, in a preferred embodiment, the apparatus will be a telephony base station, such as a DECT base station.

According to another aspect of the present invention, there is provided a method of providing first content to a node in response to instructions originating externally to the node, which first content, when received, causes the node to render the first content instead of second content, if any, currently rendered at the node, the first content being associated with a given service, wherein the method includes: (i) determining whether the second content is associated with the given service of the first content; and, (ii) in dependence on whether the second content is associated with the given service of the first content, transmitting the first content towards the node.

The invention will now be further described by way of example only and with reference to the following drawings in which:

FIG. 1 is a functional representation of a system according to the present invention in which there is provided a gateway and a handset;

FIG. 2 shows the hardware architecture of the gateway;
FIG. 3 shows the hardware architecture of the handset;
FIG. 4 shows a first sequence of messages;
FIG. 5 shows a second sequence of messages;
FIG. 6 shows a third sequence of messages;

Figure 1:
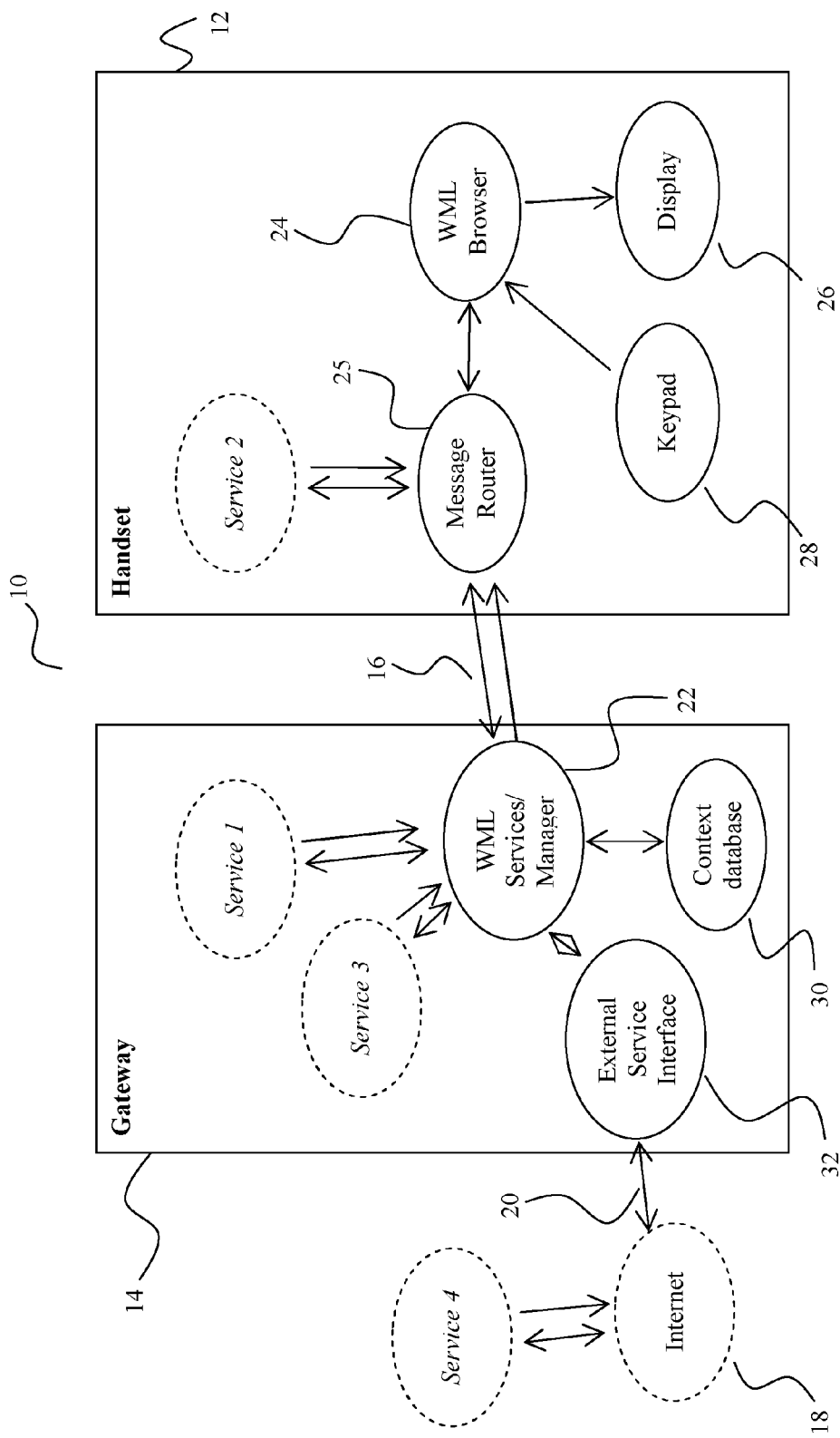

In FIG. 1, there is shown a system 10 in which a mobile terminal, here a handset 12, is able to communicate with an interface module 32 (hereinafter referred to as a gateway) over a wireless network link 16.

In overview, the handset is arranged to receive from the gateway 14 push information such as an update page relating to a particular service. By receiving information in a push manner, the need is reduced for the handset to poll the gateway in order to discover whether the information is available, thereby conserving bandwidth and handset power. Pushing information can however be inconvenient if it conflicts with information currently being rendered by the handset device.

Accordingly, before transmitting the push information, the gateway is configured to transmit a request message to the handset, in order to determine if the push information relates to a service currently being run on the handset, or whether it would conflict with such a service. The handset is configured to respond to the gateway with an indication of the service currently being run on the handset. The gateway is arranged to determine if the service being run matches or conflicts with the service corresponding to the information to be pushed. If there is a conflict of services, the gateway is arranged to refrain from transmitting the push information. In this way, the likelihood of the push information disrupting another service being run on the handset is reduced.

To conserve handset power and wireless bandwidth, the gateway is arranged to retain the identity of at least the last service provided. If this identity does not match the identity of the service associated with the push information to be transmitted, it is inferred that the current service of the handset conflicts with that of the push information, and the gateway refrains from transmitting the push information to the handset. By inferring that the current service at the handset conflicts with the push information, the need is reduced to transmit a request message to the handset in order to determine the service currently being run.

In more detail, the gateway 14 is arranged to communicate with a network, referred to as the internet 18, over a connection 20 such as a twisted pair connection using for example DSL or Digital Subscriber Line technology. The gateway 14 has a service manager 22, which acts as an interface for a browser 24 located in the handset. Both the browser and the service manager 22 are of the WML type, that is, arranged to communicate using Wireless Markup Language or WML (WML being a known document description language for creating content and user interfaces targeted at narrow-band devices).

The browser 24 generates requests for information which are transmitted to the service manager 22 over the wireless link 16. In response, the service manager returns the requested information in the required format. The browser 24 then displays the information on a display 26 of the handset 12, in the format used by the browser. A user input device, such as a keypad 28, is provided for entering user commands. The browser 24 and the keypad 28 are operatively connected so that keypad commands can for example instruct the browser to transmit requests for information to the service manager. In this way, a user can use the keypad to instigate a pull command in order to obtain information.

Although shown as separate, the keypad 28 and the display 26 could be formed integrally as a touch-sensitive display. Alternatively or in addition, a pointer device could be provided to select one of a plurality of commands on the display in order to instigate a request for information.

The handset 12 is arranged to render information from at least one of a plurality of services (service 1,2 and 3). As used herein, the term "service" refers to content data and a sequence of computer-executable instructions for providing the content data, the instructions and the data of a give service being stored on a computer-readable medium in a localised or distributed fashion, the instructions being executed on one or more processors. Each of these services has access to a context database 30 containing historical service information.

One of these services (service 2) is a local service. This service can be viewed as being located in the handset and in operative communication with the browser 24 through a message router 25, whereas service-1 and service-3 are remote services. The message router 25 is provided for routing messages from the browser to the external link 16 if the message relates to a non-local service such as service-1 or service-3. If a message relates to a local service (that is, a service provided from the handset) such as service-2, the message router 25 routes the message internally.

Although service-1 and service-3 are shown as being located in the gateway, one or more services such as a fourth service could be located at a different point in the network, information from this or these services being provided over the internet 18. An external services interface 32 is provided at the gateway in order to manage such external services.

A service may operate in one or both of a push model and a pull model. In the pull model, information is provided to the handset in response to requests instigated by the handset user. This is done on a request by request basis.

Thus a request normally relates to a given document, image or other spatially or temporally grouped items of information existing at the time of the request. Once information requested by the user has been transmitted, the service will await a fresh request before sending further information. In the pull model, it is envisaged that the user is expecting without delay the particular information identified in the user-request. One example of a pull request is a search string entered on a search engine page. The search engine then responds with a list of matching elements.

In the push model, the service itself instigates the transmission of information to the handset, rather than awaiting a user request for each transmission. Transmissions in the push model may be scheduled, or may be triggered by external events, such as particularly important news items or stock values reaching a threshold value.

For a service operating in either of the above models, the handset browser 24 is arranged to receive information from that service and display it on the display 26, overriding information being displayed at the time of receipt. In the case where the received information form a service is representative of a display page, the information contains control instructions in response to which the handset browser refreshes the display and displays the received page in place of the previous page. The control instructions need not be explicit. Here, the control instructions are provided as part of the format in which incoming content arrives and are not explicit: the handset is arranged to recognize the format and render content arriving in a recognized format when that content arrives.

Figure 2:
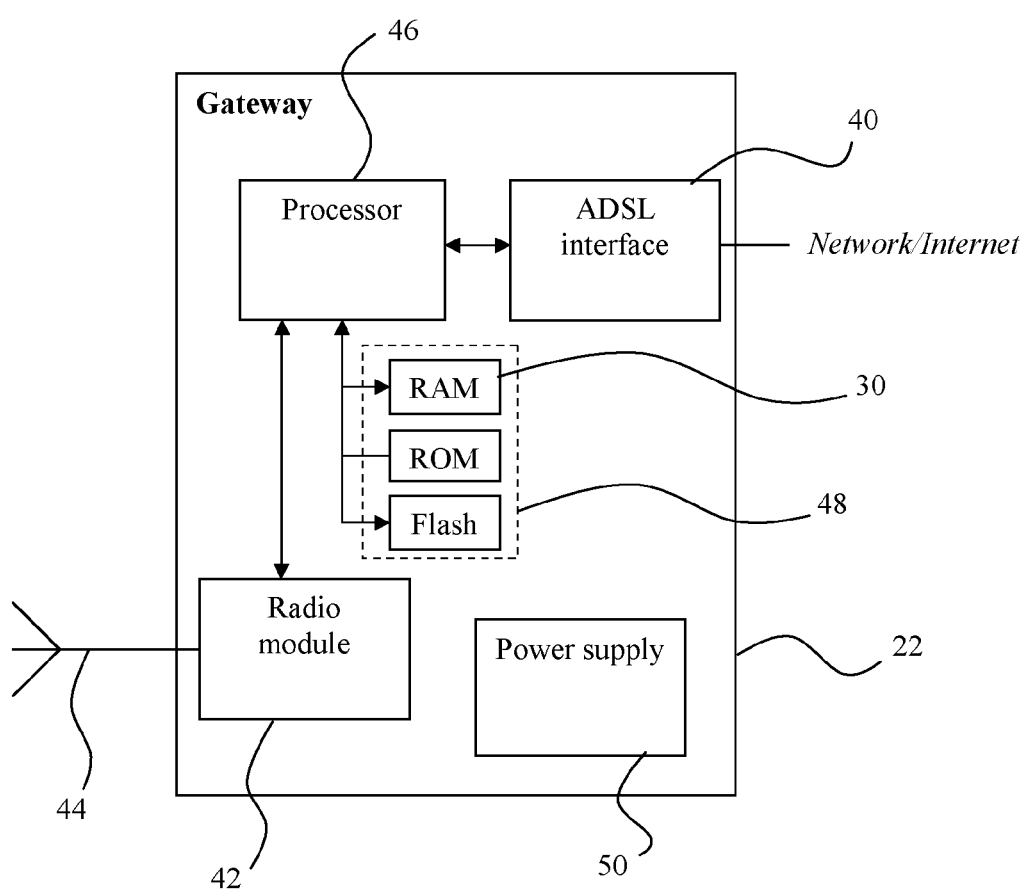

FIG. 2 shows the hardware architecture of the gateway 14. There is provided an Asymmetric Digital Subscriber Line (ADSL) interface 40 for respectively modulating and demodulating information transmitted to and received from the Internet 18, and a radio module 42 with an antenna 44 arranged to communicate wireless signals to and from the handset 12 over the wireless link 16. The ADSL interface 40 and the radio module 42 are connected to a processor module 46 arranged to process data therefrom and to output processed data thereto. The processor has access to a memory module 48, which includes a ROM memory and a flash memory. A RAM memory is also provided, in which there is stored the context database 30. Electrical power for the various gateway components is provided by a power supply 50 connected to the electrical mains (not shown).

The services 1 and 3 are software entities stored in the Flash memory, the executable instructions thereof being performed by the processor 46 such when a given service is running, content from the database 48 corresponding to that service can be retrieved by the processor for transmission by the radio module 42 to the handset. The content is retrieved from the memory module 48 or from a location within the internet 18 depending on the nature of the service. Likewise, the service manager 22 and the external service interface are software entities stored in the Flash and executed in use by the processor 46.

The service manager 22 is arranged to record the identity of the last service detected for the handset, the identities being stored by the processor 46 in the context database 30. A non-local service can conveniently be detected at the service manager 22 on the basis of service requests, since non-local service requests from the handset are channeled through the service manager. A non-local service can also be detected on the basis of information transmitted to the handset from a given service, since the information will contain an identifier indicative of the service.

Alternatively or in addition, the service manager can detect service by transmitting a general context request to the browser. This represents a request in response to which the browser 22 is configured to return to the service manager a context message indicating the identity of the service last browsed or currently being browsed. Clearly, a general context request is appropriate for detecting a local service, since the browser will not have accessed such a service through the service manager.

Figure 3:
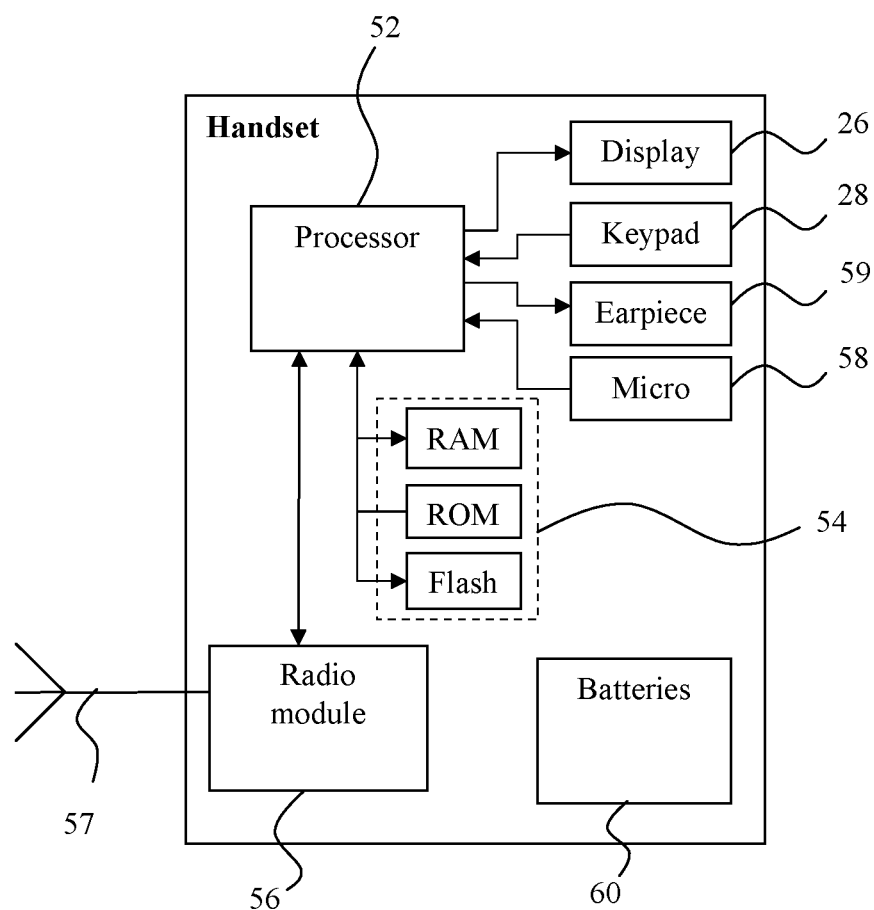

Referring to FIG. 3, the handset 12 has a processor 52 connected to a memory module 54 and a radio module 56 having an antenna 57, each of these components being arranged to perform their normal function. The memory module includes a ROM memory, a RAM memory and a flash memory. The display 26 and the keypad 28 are connected to the processor as are an audio output and input devices, here an earpiece 59 and a microphone 58 respectively. The handset components are powered by a battery power supply 60 which can be re-charged when necessary, typically after ten hours of use. Each of the browser 24 and the message router 25 are software entities stored in the memory module 54 and, when in use, executed by the processor 52. In the event that the system 10 includes a plurality of handsets, each will have a respective ID stored in Flash memory thereof.

Figure 4:
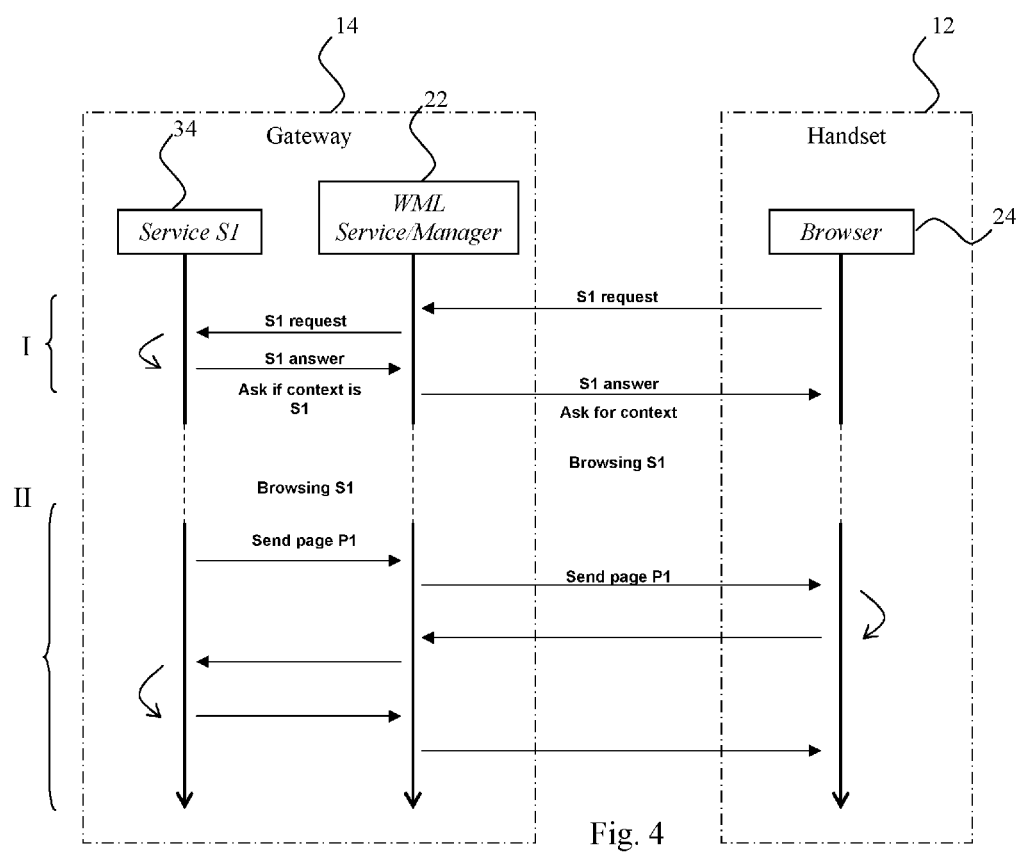

In FIG. 4, there is shown a sequence of messages transmitted between a service S1, the service manager 22, and the handset browser 24. Each message is represented by a horizontal arrow, the base and tip of an arrow indicating respectively the origin and destination of the corresponding message. Increasing time is indicated by downwardly pointing arrows, dotted lines representing extended time intervals between messages. A curly arrow joining an incoming message and an outgoing message indicates that the outgoing message is sent in response to the incoming message.

The messages are temporally grouped into two phases. In a first phase I of FIG. 4, the browser browses service S1. Initially, the handset browser transmits a request to the service manager (the S1 request) requesting a service. The service manager 22 then forwards the request to the appropriate service, here service S1. In response to this request, service S1 transmits the requested information in the form of the S1 answer as shown in FIG. 4. The service manager then relays the S1 answer to the handset browser 24. The handset browser, in response to receiving the S1 answer message, uses the information in the answer message to display a page on the display 26 representative of the received information. In this way, the handset browser 24 browses the S1 service.

The service manager 22 is arranged to store the S1 request from the handset browser 24 in the context database.

In a second phase II occurring some time after the end of the first phase, service S1, operating according to the push model, "wishes" to transmit an information page P1. That is, service S1 is triggered by an event external to the handset to initiate a push transmission of the information page P1.

In order to determine whether the page P1 would conflict with the service currently being browsed at the handset, service S1 is arranged to first transmit a specific context request to the service manager 22, shown in FIG. 4 as an "ask if context is S1" message. This specific context request represents a request for a binary (that is, positive or negative) indication of whether the currently browsed service is service S1. Such an indication limits the amount of information provided about the browsing habits of the handset user, and is particularly useful if the service is external to the gateway.

In response to the specific context request, the service manager 22 is configured to interrogate the context database 30 to determine if the service last requested by the handset browser was S1. If the last service was not S1, the service manager returns a message "not browsing S1". This negative binary message prevents the service S1 from pushing a fresh page.

If, on the other hand, the last service stored in the context database 30 was S1, there is a possibility that service S1 is still running on the handset (that is, that a page relating to this service is currently displayed by the handset). To determine whether this is the case, the service manager generates a general context request which it transmits to the handset. The general context request is shown in FIG. 4 as an "ask for context" message. The "ask for context" message has a field containing an instruction in response to which the handset replies with a message indicative of the service currently being run.

In the present example, since the browser is still browsing service S1 (that is, a page from service S1 is still displayed), the handset browser returns a context message, here a "browsing S1" message, to the service manager 22 indicating that service S1 is currently being browsed. The "browsing S1" message is then translated by the service manager into a positive binary response which is transmitted to service S1.

The positive response enables the service S1 to transmit information page P1 to the service manager, since the service being browsed corresponds to the service wishing to push information. The service manager then forwards this page to the handset browser 22, which displays the page on the display 26.

In the above embodiment, the service manager responds to the "ask if context is S1" with a binary response to protect the privacy of the handset user. However, in an alternative embodiment, the service manager responds with an identifier indicative of the service being browsed, the service S1 being arranged to (i) compare the received identity of the currently-browsed service (here S1) with its own identity and (ii) in the event that the two identities match, transmit the page P1.

The example of FIG. 4 can be viewed as a situation in which, by transmitting a specific context request, the service S1 effectively asks the service manager if the handset is currently browsing this service. In order provide a response, the service manager transmits a general context request to the handset, the handset answering with the ID of the service that is currently being browsed. A positive or negative answer is relayed to the service S1, respectively enabling or not enabling it to send page P1.

Figure 5:
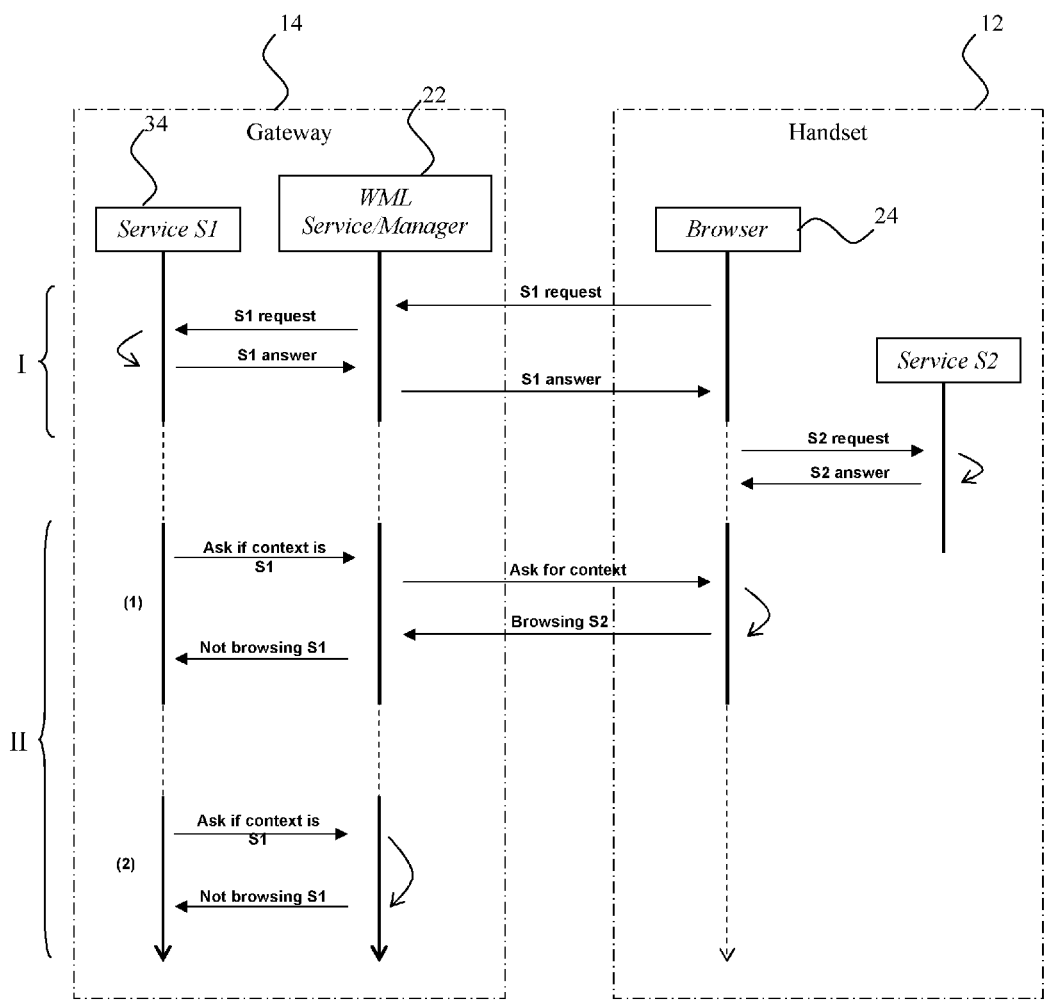

FIG. 5 shows a sequence of messages in a situation where service S1 is obliged to refrain from transmitting a fresh page. Here, labels corresponding to those of FIG. 2 have a similar meaning.

As in FIG. 4, the sequence of FIG. 5 has a first phase I in which the handset is browsing S1. However, after browsing service S1, the browser begins browsing a local service S2 different to service S1. This browsing is represented in FIG. 5 as an "S2 request" from the browser followed by an "S2 answer" from service S2.

In the second phase II, service S1, wishing to push a fresh page P1, transmits a specific context request "ask if context is S1" to the service manager. As in FIG. 4, the service manager then seeks an indication of the identity of the service currently being browsed at the handset with a general context request. However, since the last service browsed at the handset is now service S2, the browser returns a message "browsing S2". In turn, the service manager generates a message "not browsing S1". The "not browsing S1" message represents a negative response to the context request from service S1. Consequently, service S1 is not enabled to transmit the page P1.

The service S1 then initiates a new specific context request, to which the service manager provides again a negative response in the form of a "not browsing S1" message. The service S1 is arranged to repeat the transmission of the context request at time intervals until a positive response is obtained from the service manager, at which point the service S1 becomes enabled transmit the fresh page P1.

Figure 6:
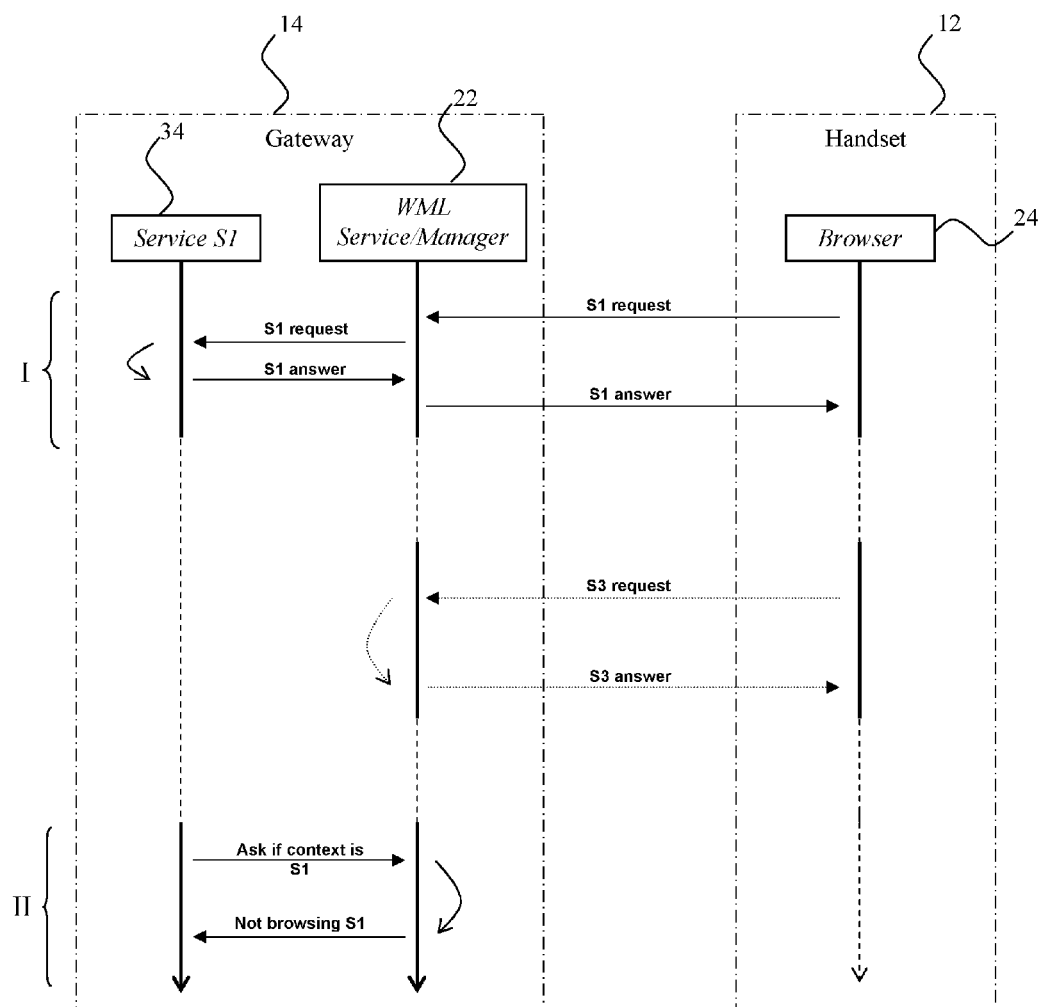

FIG. 6 illustrates yet another possible sequence of message. Here, in phase I, the browser browses service S1 as in FIG. 5. However, the browser then transmits a request for another non-local service to the service manager, here service S3. On the basis of the received request, the service manager detects service S3, and stores S3 as the last detected service in the context database 30. Subsequently, if service S1 transmits a specific context request "ask if context is S1" to the service manager, the service manager 22 interrogates the context database 30. Since the last detected service is not S1, the service manager responds with a "not browsing S1" message, and the service S1 is not enabled to push a fresh page P1. Clearly, the service manager can make the inference that the browser is not browsing S1 since an S1 request or information pushed by service S1 would have passed through and consequently been detected by the service manager.

Figure 7:
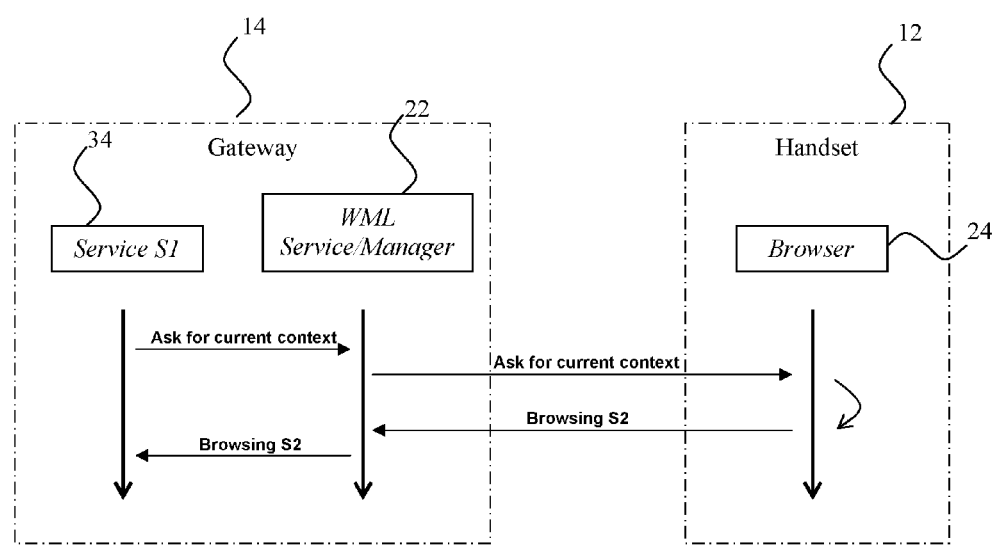
FIG. 7 shows a fourth sequence of messages; and,
FIGS. 8 to 15 show various stages of a flow chart indicating the steps taken at the service, the service manager and the handset browser; and, FIG. 16a is a further view of the handset architecture, at a level different to that of FIG. 3.

In FIG. 7, service S1 transmits a general context request to the service manager rather than a specific context request. The service manager then generates a fresh general context request, which is answered by the browser in the form of a "browsing S2" message. The service manager then forwards the identity of the currently-browsed service to service S1, rather than providing a positive or negative response. Although the situation illustrated in FIG. 7 is possible, the embodiments of FIGS. 4-6 in which the service S1 transmits a specific context request and receives a positive or negative response is preferred, as in these embodiments, the privacy of the handset user is better protected The situation in FIG. 4 can be illustrated by the following example: a user wishes to access the handset call log, which is managed in the gateway by a service entitled "call log service" corresponding to service S1. The user sends a request to the gateway (the "S1 request" in FIG. 4) request in the call log service. As the call log service requires some time to build the call log document, the call log service sends to the handset a "please wait" document (corresponding to the "S1 answer") indicating to the user that his request has been received and is being processed. When the call log document is ready, the call log service asks the service manager if the call log service is still being browsed on the handset, in the form of an "ask if context is S1" message. The service manager then opens a wireless connection with the handset and transmits an "ask for context" message in order to obtain the identity of the service currently being browsed. As the service has not changed, the handset browser returns an indication to the service manager to indicate that it is still browsing the call log service, that is, that the display page corresponding to the call log is still being displayed. The service manager then transmits a positive response to the call log service, indicating that call log service is still being browsed. The call log service then sends the final document.

However, whilst waiting for the call log service to build the call log, the user may become impatient and decide to access another Gateway service, for example the "Yellow Pages" service. When the service manager receives the request for the Yellow Pages service, it updates its context database.

In this case, corresponding to the situation shown FIG. 6, when the call log service asks the service manager if the context is S1, the service manager interrogates the context database and is able to return a negative response without having to set up a fresh wireless link with the handset. The Call Log service will then refrain from transmitting a Call Log page which could disrupt the Yellow Pages service and confused the user.

In this way, the risk of service conflicts on the handset is reduced, whilst the need to open a costly wireless link can also be reduced. When opened, a wireless link normally carries synchronisation packets exchanged between the wireless devices and results in more power consumption than in a not-connected state. More, wireless connection bandwidth is often shared with other devices. An opened connection implies a risk of preventing a connection between other devices. It is then very advantageous to avoid any avoidable link.

FIGS. 8 to 15 show various stages of a flow chart indicating the steps taken at the service, the service manager and the handset browser.

Figure 8:
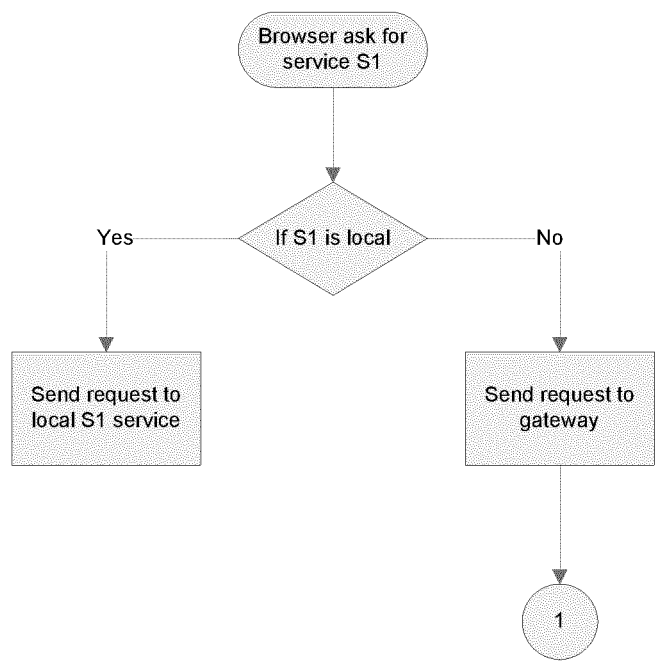
Figure 9:
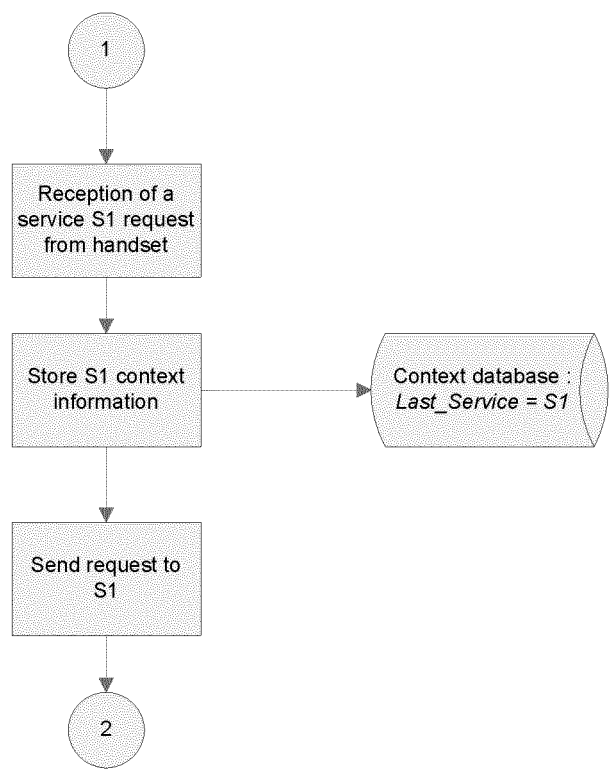

In FIG. 8, showing the steps performed at the handset, the browser requests service S1. This request could for example be the result of a user input. The message router 25 then determines if service S1 is local, and if so, sends a service request to the local service. Otherwise, the service request is transmitted to the Gateway over the wireless link 16. FIG. 9 shows the steps at the service manager, which receives the service request. Upon receiving the request, the service manager stores the identifier S1 of the service as context information in the context database, in the form last_service=S1. In effect, the service manager stores in memory the fact that the last service accessed through the Gateway is S1. The service manager then transmits the request towards service S1.

Figure 10:
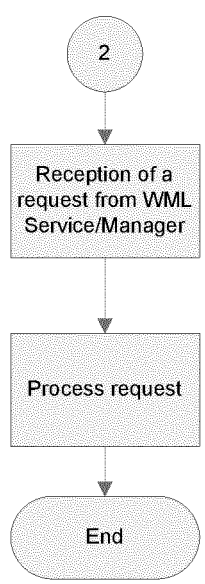
Figure 11:
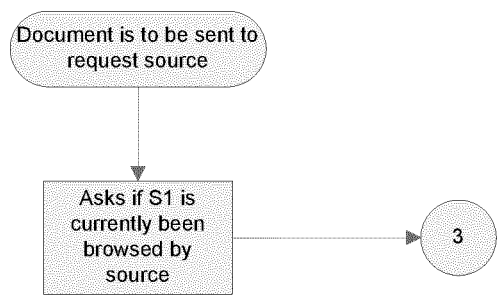

In FIG. 10, the service S1 receives the forwarded request from the service manager and processes the request. A service can send documents in different ways, for example as a response to a request, or as an update to an already sent document. In other words, a service can work in both pull and push modes. However, as indicated in FIG. 11, before service S1 transmits a document, it asks if information from service S1 is currently being browsed by the source of the request. This is done by transmitting a specific context request to the service manager.

Figure 12:
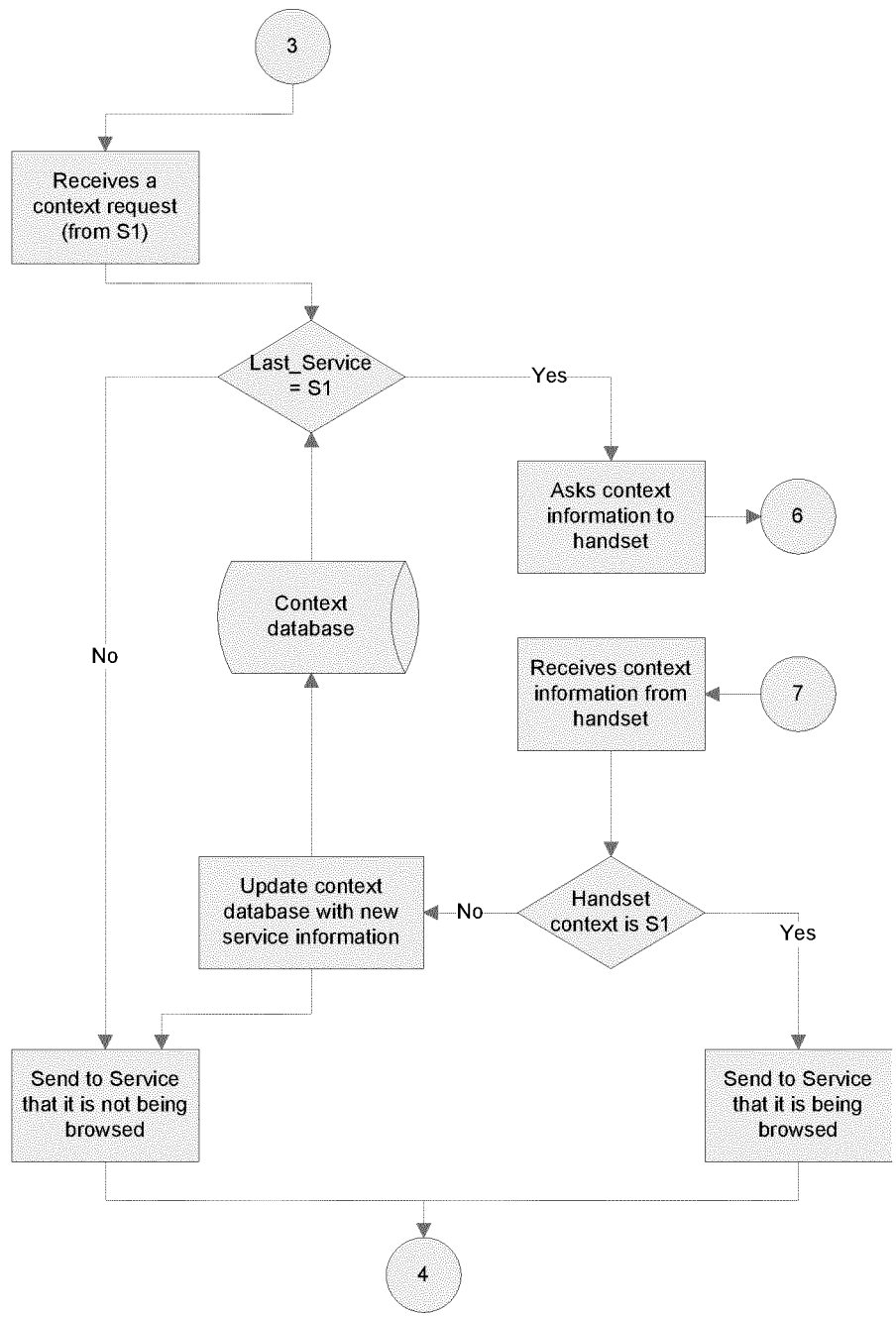

FIG. 12 shows the steps performed by the service manager in response to a specific context request from a service, here service S1. Upon receipt of the specific context request from service S1, the service manager determines from the context database if the value of last_service is equal to S1.

Figure 13:
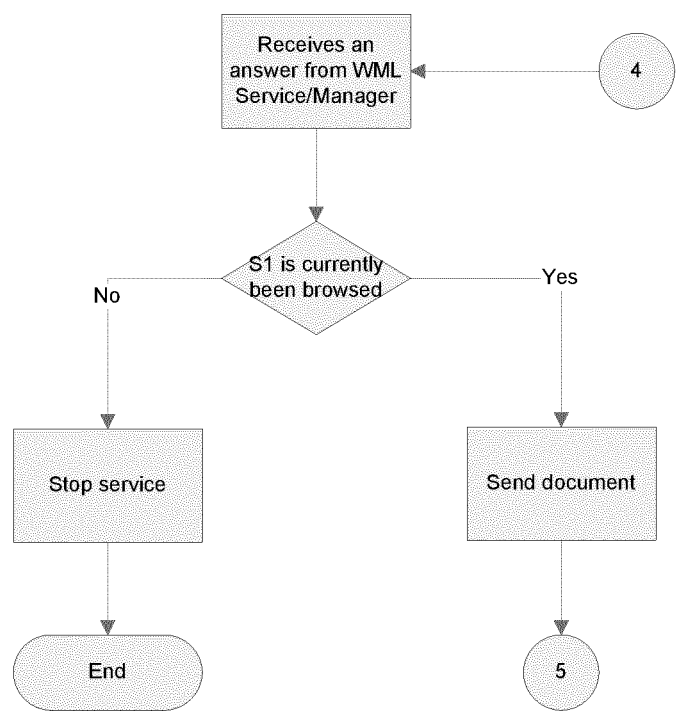

If value of last_service not equal to S1, a negative response is returned to the service S1. That is, an indication is sent to service S1 that S1 is not being browsed by the handset (a "not browsing S1" message). As shown in FIG. 13, when the message from the service manager is received at the service S1, the service S1 determines whether the message indicates that S1 is currently being browsed at the handset. If S1 is not being browsed, a "stop service" command is issued, and the service ends. Else, a document such as the fresh page P1 is sent.

Returning to FIG. 12, if last_service=S1 is true, a general context request in the form of an "ask for context" message is transmitted by the service manager to the handset browser. The "ask for context" message does not specify the desired service, since this would not significantly influence the cost of opening a wireless link (the connection needs to be opened in each case and there is no confidentiality issue here because Service Manager is crossed by every message coming from and going to handset browser. Moreover, the difference in payload cost between a "ask for context" message and a "ask if service is running" message is only a few byte length).

Figure 14:
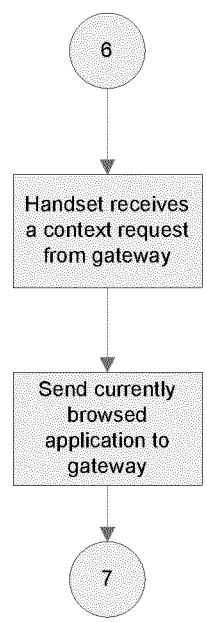

This "ask for context" message is received at the handset browser as shown in FIG. 14, where the identity of the currently browsed application is transmitted back to the Gateway in a context message. Returning again to FIG. 12, the context message from the handset is received at the service manager of the Gateway, where it is determined if the service being browsed is S1. If the service being browsed is not S1, a "not browsing S1" message is transmitted back to the service, and the context database is updated with the identity of the service browsed. This update information will be useful in the future in order to allow the Gateway to answer context request messages without necessarily opening a wireless link to the handset.

If the handset context is determined to be S1 from the received handset context message, this information is transmitted to the service S1 in the form of a "browsing S1" message.

Figure 15:
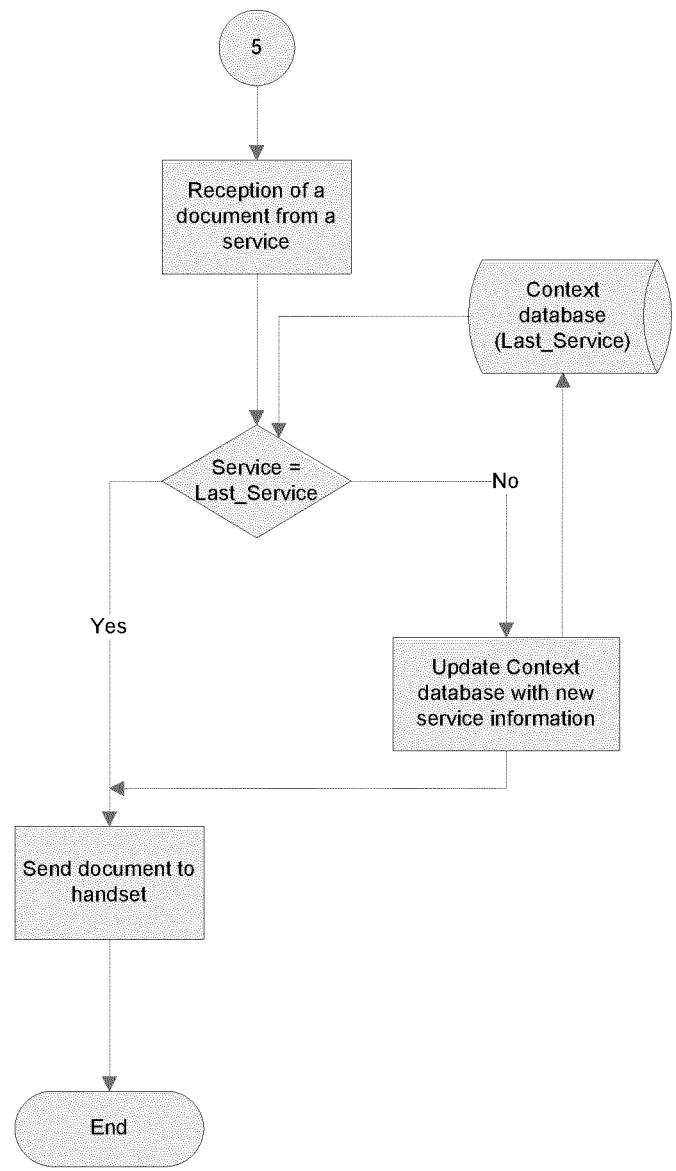

FIG. 15 shows the steps carried out at the service manager upon reception of a document such as page P1 from service S1. After receiving the document, the service manager determines if the identity of the service from which the document originates matches that stored in the context database: that is, whether S1 equals the value of last_service in the database. In either case, the document is transmitted to the handset. However, if the value of last_service does not match S1, the context database is updated with new service information, and the value last_service is set to value S1 (such a situation could occur if service S1 is an alert service which has to be sent whatever current browser running service is.). In this way, the context database can be interrogated upon receipt of a fresh service request in order to reduce the need to transmit a context request to the handset.

Although in the above embodiments only a single handset provided, a plurality of handsets may be provided. In this case the context database will store a value for last_service for each handset in association with a respective identifier for that handset, for example in the form of a lookup table.

Figure 16A:
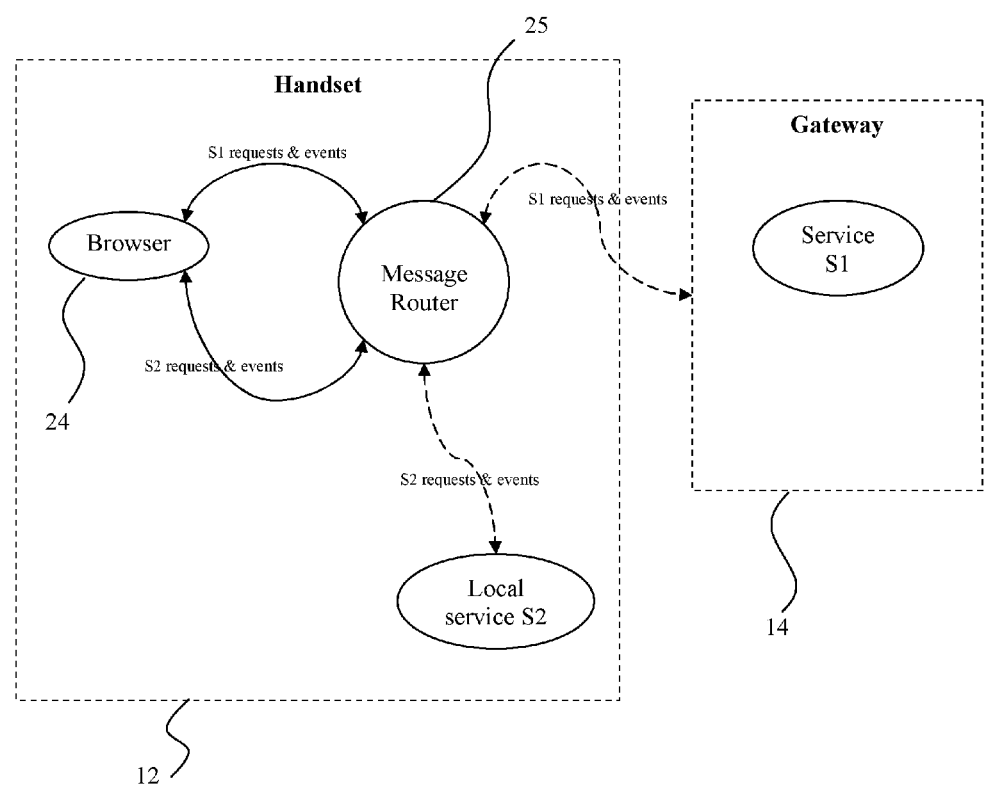
FIG. 16b is a further view of the gateway architecture.
Figure 16B:
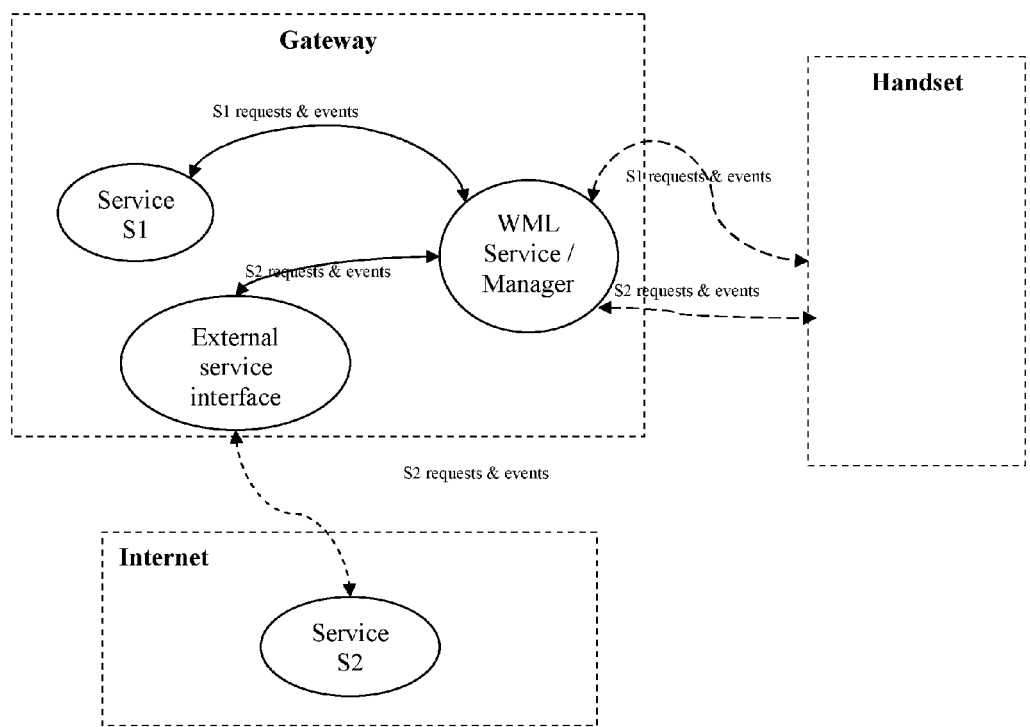

FIG. 16a is a further view of the architecture of the handset 12 showing various logical functions or software modules. In addition to the browser 24 and local service S2, there is shown a message router, whose purpose is to route requests and events from the browser to the gateway or to the local service S2 (FIG. 16b is a diagram showing corresponding detail in the gateway)

An example of the format for answers and events from a remote or locale service received by the message router is shown in Table 1. The possible document types received by the handset are listed in Table 2.

The full format of a possible document received by the handset is shown in Table 3. An image document format is shown in Table 4.

The format of an event is shown in Table 5. An event can be a message reporting an error during a browser request (not found document, service is not responding, document too big, or any other error message which must be notified to browser)

The format for context request is shown in Table 6. Answers from the handset to the gateway are sent through the http request format with the context scheme. The scheme is used to identify if a service is local (handset://), embedded in gateway (base://) or located outside system (Internet, http://).

For example:

GET handset://phone_settings where phone_settings is handset local service

GET base://call_log where call_log is a service located in gateway

GET http://yellow_pages where yellow_pages is a service located in Internet

By using a standard http request format, we are able to grant a wireless device such as a Dect handset full compatibility with a base/gateway not embedding the context management mechanism.

TABLE 1

Document header

| Parameter | Length (B) | Description |
|---|---|---|
| size | 2 | Document size, in bytes and little endian format (including all header) |
| type | 1 | Document type |

TABLE 2

Document type

| 0x01 | WML Deck |
|---|---|
| 0x02 | Image |
| 0x03 | Event |
| 0x04 | Context request |

TABLE 3

Deck document format

| Parameter | Length (B) | Description |
|---|---|---|
| Size | 2 | Document size, in bytes and little endian format (including all header) |
| Type | 1 | Document type. 0x01 for WML deck |
| image_nb | 1 | Number of images following this deck sent by gateway |
| Name | Null-terminated string | Deck url |
| payload | n | Deck |

TABLE 4

Image document format

| Parameter | Length (B) | Description |
|---|---|---|
| Size | 2 | Document size, in bytes and little endian format (including all header) |
| Type | 1 | Document type. 0x02 for image |
| Format | 1 | Encoding format:<br>0x00: RGB 16 bit (565)<br>0x01: RLE 16 bit<br>0x02: RBG 8 bit (332)<br>0x03: RLE 8 bit |
| Name | Null-terminated string | Image url |
| payload | n | Image |

TABLE 5

Event document format

| Parameter | Length (B) | Description |
|---|---|---|
| Size | 2 | Document size, in bytes and little endian format (including all header) |
| Type | 1 | Document type. 0x03 for event |
| 0x00 | 1 | Unused |
| Code | 1 | Event code:<br>0x00: Document not found<br>0x01: Service not responding<br>0x02: Document overflow |

TABLE 6

Context request format

| Parameter | Length (B) | Description |
| --- | --- | --- |
| Size | 2 | Document size, in bytes and little endian format (including all header) |
| Type | 1 | Document type. 0x04 for context request |
| 0x00 | 1 | Unused |

Figure 17:
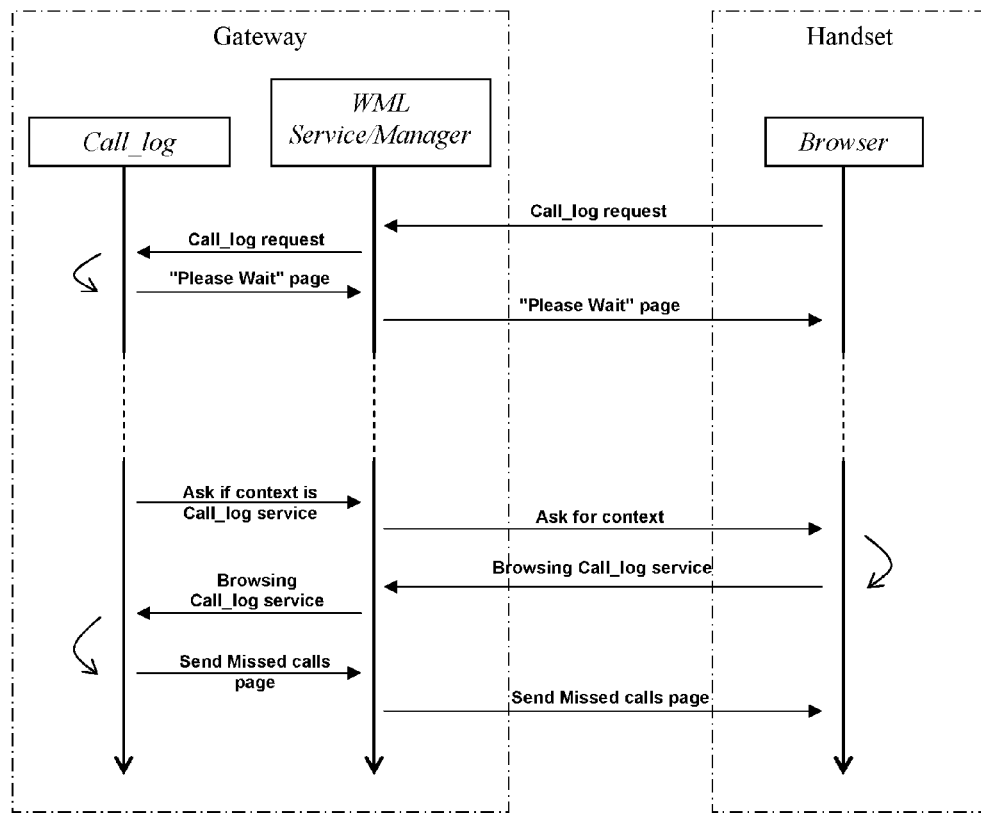
FIGS. 17 to 19 show further sequences of messages.
Figure 18:
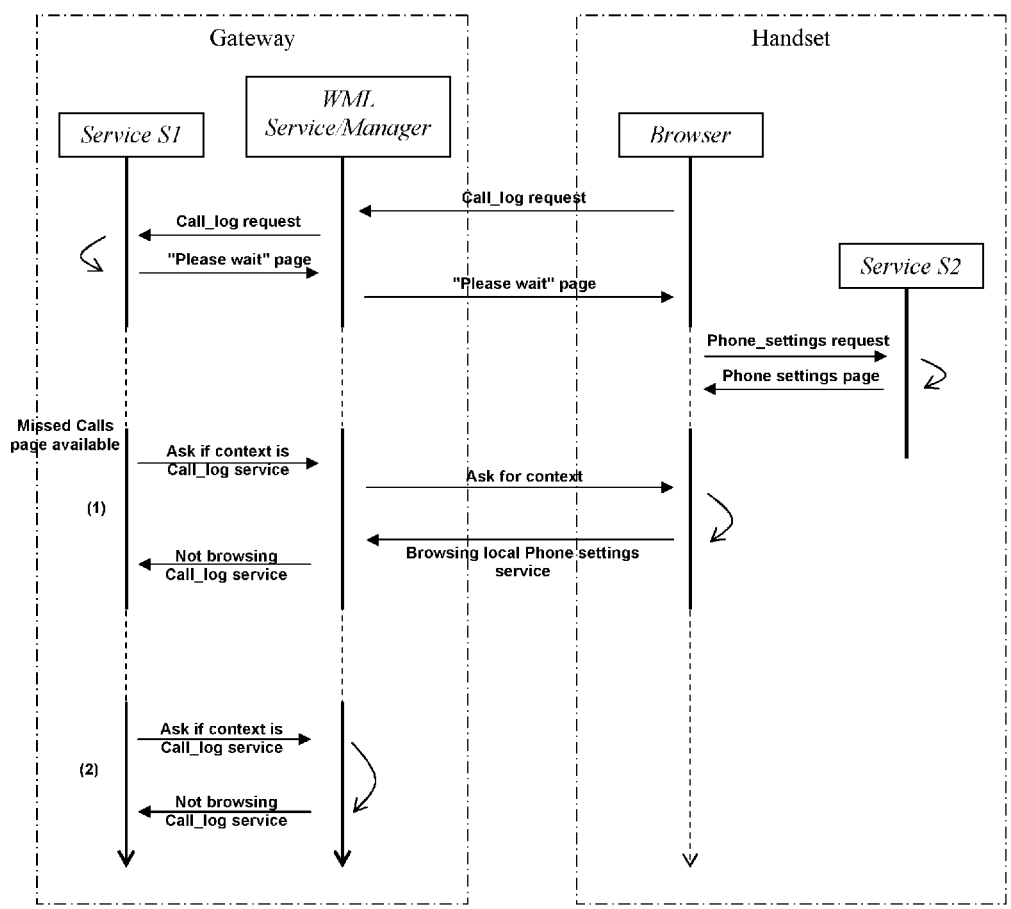
Figure 19:
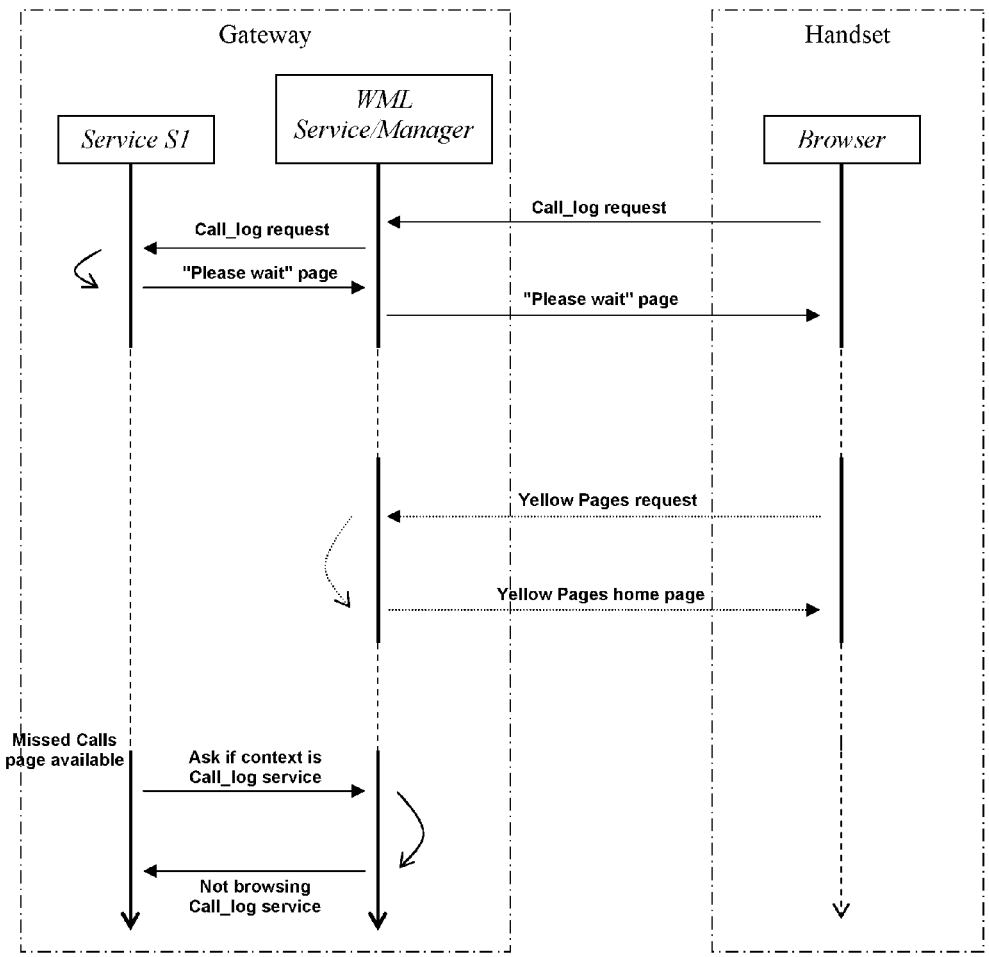

FIGS. 17 to 19 relate to examples of multi service access with context management to reduce the likelihood of conflicts. In one example shown in FIG. 17, a user wants to access handset call log. The call log is managed in gateway by a service called "Call log Service".

First, the handset sends a request to gateway. As it needs some time to build call log document, the Call log Service sends to handset a "Please Wait" document telling user that his request has been received and is currently been processed. It is also able to use this waiting time to push ads before the final document is available.

In the scenario of FIG. 17, the user waits for service answer with no action on handset. When Call log document is ready, Call log service asks WML Service/Manager if it is still being used on handset. WML Service/Manager opens a wireless link with handset and asks for context information. As service has not been changed, then, it tells Call log Service that it is still being browsed. This latter sends then final document.

In summary, FIG. 17 shows a scenario where Call_log service wants to push a new page (Missed calls) and last handset activity has been browsing this service. Before sending Missed calls page, Call_log service asks to WML Service/Manager component if handset is currently browsing this service. To check if there has been no local browsing on handset, WML Service/Manager, at its turn, sends context check to handset which answers that this service is currently being browsed. Call_log service can then send Missed calls page.

As the last activity through WML service/manager was for Call_log service, a connection with handset is needed to check if this latter is still browsing Call_log service (i.e. it hasn't switched to a local service). This connection cost is negligible because it will be re-used to send Missed calls page without the need to close it and to open another one. In some wireless technology, connection closing and opening can last until one or some seconds. Using the same connection implies a more reactive system and a shorter wireless link use period.

FIG. 18 shows a scenario where Call_log service service wants to push a new page (Missed calls) but handset has switched to another local service (Phone settings). Before sending Missed calls page, Call_log service asks to WML Service/Manager component if handset is currently browsing this service S1. To check if there has been no local browsing on handset, WML Service/Manager, at its turn, sends context check to handset which answers it is browsing local Phone settings service. WML Service/Manager concludes that Call_log service is currently not being browsed and informs Call_log service. This latter decides, then, not to send Missed calls page.

WML service/manager now knows that handset has switched to Phone settings service. Next time Call_log service will ask for Call_log context (2), WML service/manager will be able to answer "Not browsing Call_log service" without any connection to handset.

FIG. 19 shows a scenario where Call_log service wants to push a new page (Missed Calls) but handset has switched to another remote service. Before sending Missed Calls page, Call_log service asks to WML Service/Manager component if handset is currently browsing this service. As all page push must go through this component, this latter knows that another service has been accessed since last Call_log page push. Handset connection can be avoided to answer Call_log service that it is not being browsed.

Thought this solution is described for a handset with only one WML buffer, it could advantageously be extended to multi buffer devices. As answer to context request, a multi buffer handset would send a list of currently browsed services. Gateway WML Service/Manager would manage a list browsed services in its context database. This extension doesn't change the principle of this solution but explains how the solution could be applied to all devices with a browser (as they all have a limited memory space), whether they can browse only one document or several one at the same time.

In summary, these embodiments apply to wireless devices which embed a browser to offer access to different services. Such devices offer a common user interface (one screen, one keypad, on audio input/output) to multiple services which are independent and normally do not have a communication link between them (for example a Weather service and a Yellow Pages service).

For a device with little memory or bandwidth constraints, this latter can store in this memory some different documents in its memory and manages service access quite easily (multitab browser for example).

However, for a device with very low memory, where only one document can be stored or a limited number can be stored, service access can become conflictuous, especially in a push model.

In a pull model, handset asks a document to a service and all document it receives in an answer to one of its requests. It can easily manage conflicts between services but the cost is the need to pull services to get up-to-date document. This pull needs a radio connection, costly in term of bandwidth and power consumption, which is wasteful when there is no document update.

The answer for this issue is to support push model. In a push model, services decide when to push a document where an update is available. With a single service, the single user interface offered by handset can work effectively. But with multiple services, these latter can become concurrent and can corrupt user interface when a service document is pushed when user browses another one.

The above embodiments can offer a way to services to work in a push model with the following benefits: handset doesn't need to pull a service to get an update; a service can know handset state and activity before sending it a document update; and, the knowledge is granted with the constraint of avoiding any useless handset connection. Though it works in a push model, this solution is compatible with pull model.

The invention claimed is:

1. An apparatus comprising:
a memory; and
at least one processor configured to:
receive a context request from a gateway to determine whether first content associated with a service is currently rendered on a display;
notify the gateway whether the first content is being rendered on the display in response to the context request;

determine whether a service associated with a second content matches the service associated with the first content currently rendered on the display; and when the first content is currently rendered on the display and the service associated with the second content matches the service associated with the first content, refresh the display such that the second content overrides the first content.

2. The apparatus as claimed in claim 1, wherein the at least one processor is further configured to respond to the context request with either one of a positive indication or a negative indication that the first content is currently rendered.

3. The apparatus as claimed in claim 1, wherein the second content is received as a push message from the service.

4. The apparatus as claimed in claim 1, wherein the at least one processor is further configured to:
generate a content request; and
transmit the content request to the gateway.

5. The apparatus as claimed in claim 1, wherein the at least one processor is further configured to display the first content or the second content in a browser.

6. The apparatus as claimed in claim 1, wherein the second content is received when the second content does not conflict with the first content.

7. The apparatus as claimed in claim 1, further comprising displaying, using the at least one processor, the first content or the second content in a browser.

8. The apparatus as claimed in claim 1, further comprising receiving, by the at least one processor, the second content when the second content does not conflict with the first content.

9. A method comprising:
receiving, by at least one processor, a context request from a gateway to determine whether first content associated with a service is currently rendered on a display;
notifying, by the at least one processor, the gateway whether the first content is being rendered on the display in response to the context request;
determining, by the at least one processor, whether a service associated with a second content matches the service associated with the first content currently rendered on the display; and
when the first content is currently rendered on the display and the service associated with the second content matches the service associated with the first content, refreshing, by the at least one processor, the display such that the second content overrides the first content.

10. The method as claimed in claim 9, further comprising responding, by the at least one processor, to the context request with either one of a positive or a negative indication that the first content is currently rendered.

11. The method as claimed in claim 10, wherein the second content is received as a push message from the service.

12. The method as claimed in claim 11, further comprising generating, by the at least one processor, a content request; and transmitting, by the at least one processor, the content request to the gateway.

13. A gateway apparatus comprising:
a memory; and
at least one processor configured to:
receive a push message associated with a service, the push message comprising content;
identify whether the service is running in a mobile device;
when the service is not running on the mobile device, identify whether another service running in the mobile device conflicts with the service;
when the service is running in the mobile device or another service in the mobile device does not conflict with the service, transmit the content to the mobile device; and
when another service running in the mobile device conflicts with the service, refrain from transmitting the content to the mobile device.

14. The gateway apparatus as claimed in claim 13, wherein the at least one processor is further configured to respond to the push message with either one of a positive indication or a negative indication that the service is running in the mobile device or that another service in the mobile device does not conflict with the service.

15. The gateway apparatus as claimed in claim 14, wherein the at least one processor is further configured to forward the positive indication or the negative indication to the service.

16. The gateway apparatus as claimed in claim 13, wherein to identify whether the service is running in a mobile device the at least one processor is further configured to transmit a context request to the mobile device.

17. The gateway apparatus as claimed in claim 13, wherein the at least one processor is further configured to search a context database to determine identify a previous service requested by the mobile device.

18. A method comprising:
receiving, by at least one processor, a push message associated with a service, the push message comprising content;
identifying, by the at least one processor, whether the service is running in a mobile device;
when the service is not running on the mobile device, identifying, by the at least one processor, whether another service running in the mobile device conflicts with the service;
when the service is running in the mobile device or another service in the mobile device does not conflict with the service, transmitting, using the at least one processor, the content to the mobile device; and
when another service running in the mobile device conflicts with the service, refraining from transmitting the content to the mobile device.

19. The method as claimed in claim 18, wherein further comprising responding, using the at least one processor, to the push message with either one of a positive indication or a negative indication that the service is running in the mobile device or that another service in the mobile device does not conflict with the service.

20. The method as claimed in claim 19, further comprising forwarding, using the at least one processor, the positive indication or the negative indication to the service.

21. The method as claimed in claim 18, wherein the identifying further comprises transmitting, using the at least one processor, a context request to the mobile device.

22. The method as claimed in claim 18, wherein the identifying further comprises searching, using the at least one processor, a context database to identify a previous service requested by the mobile device.

* * * * *